United States Patent [19]

Nishi et al.

[11] Patent Number: 4,791,441
[45] Date of Patent: Dec. 13, 1988

[54] MULTI-FOCUS CAMERA

[75] Inventors: Kohichi Nishi, Yokohama; Kunihisa Yamaguchi, Ichikawa; Ikuya Turukawa, Yokohama, all of Japan

[73] Assignee: Ricoh Company, Ltd., Tokyo, Japan

[21] Appl. No.: 113,071

[22] Filed: Oct. 27, 1987

[30] Foreign Application Priority Data

Oct. 28, 1986 [JP] Japan .................. 61-164219[U]

[51] Int. Cl.$^4$ ................................................. G03B 3/00
[52] U.S. Cl. ................. 354/195.12; 350/422
[58] Field of Search ............ 354/195.12, 195.1; 350/422

[56] References Cited

U.S. PATENT DOCUMENTS

| | | | |
|---|---|---|---|
| 4,482,228 | 11/1984 | Fujita | 354/195.12 |
| 4,525,050 | 6/1985 | Ohashi | 354/195.12 |
| 4,725,864 | 2/1988 | Ogawa et al. | 354/195.12 |

FOREIGN PATENT DOCUMENTS

| | | | |
|---|---|---|---|
| 59-17540 | 1/1984 | Japan | 354/195.12 |
| 59-19926 | 2/1984 | Japan | 354/195.12 |
| 60-114838 | 6/1985 | Japan | 354/195.12 |

*Primary Examiner*—A. A. Mathews
*Attorney, Agent, or Firm*—Oblon, Fisher, Spivak, McClelland, & Maier

[57] ABSTRACT

A two-focus camera in which a short focal-distance lens system is constituted by only a main lens when the main lens is set at a first position on an optical axis and a converter lens is set at a second position out of the optical axis, and a longer focal-distance lens system is constituted by the main lens and the converter lens when the main lens is set at a third position in front of the first position on the optical axis and the converter lens system is set at a fourth position behind the main lens on the optical axis.

2 Claims, 11 Drawing Sheets

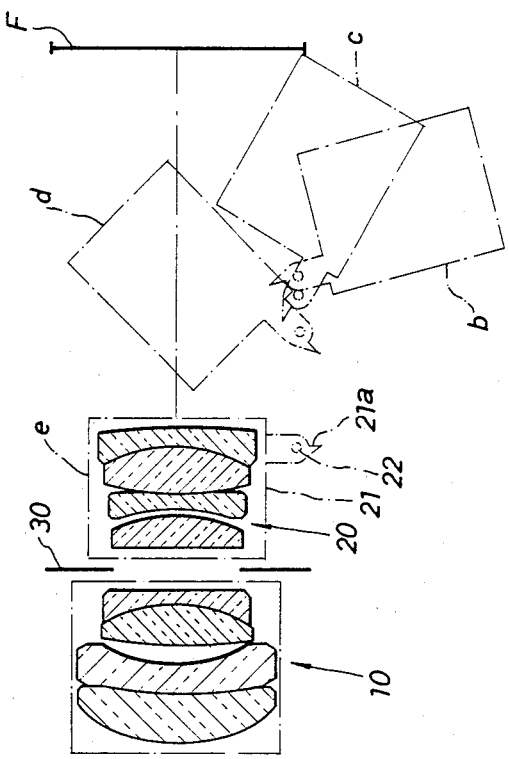
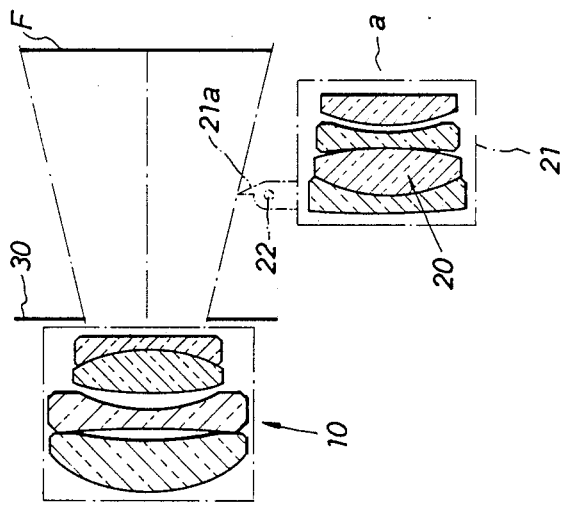
FIG. 2 (A)
FIG. 2 (B)

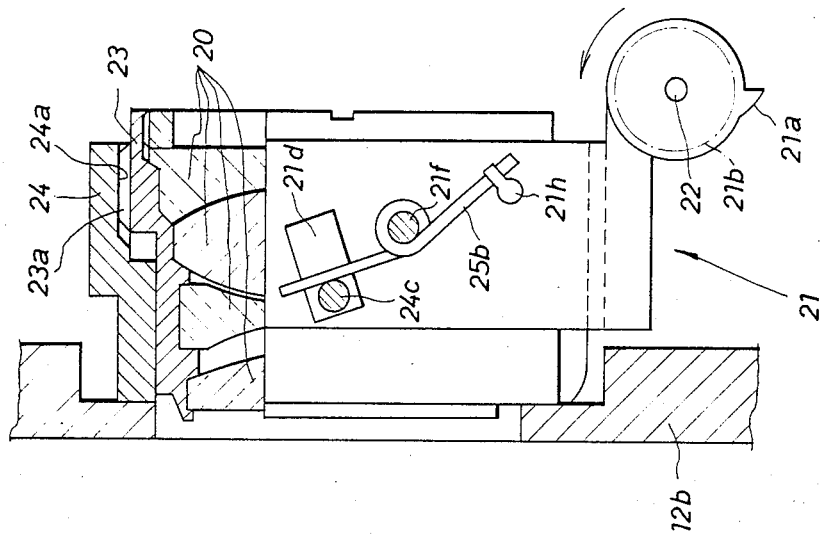
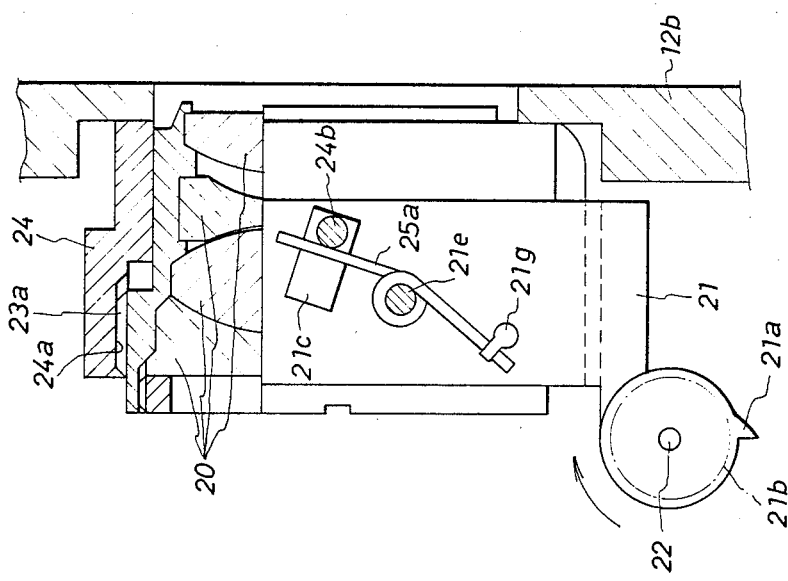

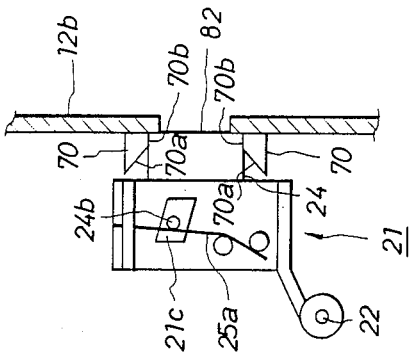
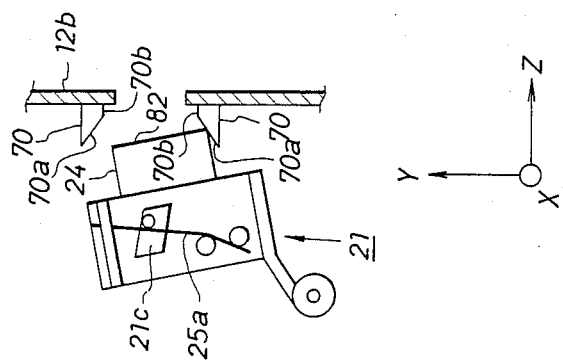
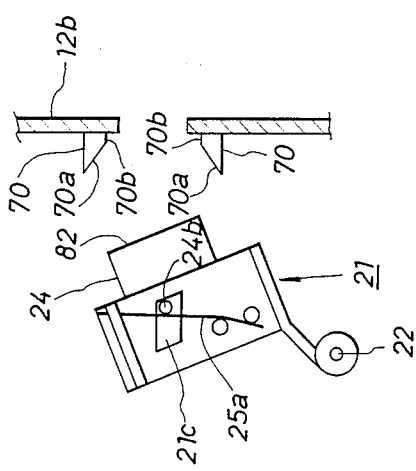

MULTI-FOCUS CAMERA

This invention relates to a multi-focus camera.

Generally, in order to take photographs which satisfy various ideas, it is required to use corresponding lenses different in focal distance and optimal for photographing purposes. As a camera which satisfies such requirements, there is a lens-exchangeable single-lens reflex camera. Although such a single-lens reflex camera is capable of satisfying almost all photographing ideas, it is bulky and expensive. In order to use such a camera, one must obtain several expensive large-sized exchange lenses and carry them with him, therefore, everybody cannot easily use such camera.

In taking a normal photograph, two lenses, namely, a wide-angle lens and a telephoto lens, would suffice almost all photographing desires.

Recently, lens-shutter type multi-focus cameras are appearing one after another. A camera of this type generally includes a main lens and a converter lens in its casing, in which the main lens is always disposed movably along the optical axis and the converter lens is selectively inserted on the optical axis.

A focal-distance switching mechanism in such a multi-focus camera is disclosed, for example, in Published Unexamined Japanese Patent Application No. 17540/1984. This conventional apparatus includes a main lens slidable between a first position and a second position using a support shaft as a guide provided in a lens barrel along the optical axis and a converter lens which can be inserted on the optical axis. The lens barrel fixing the converter lens therein is supported rotatable around a support provided out of the optical axis.

Switching between a first focal distance (for example, in the wide-angle photographing) and a second focal distance (for example, in the telephoto photographing) is performed as follows.

In order to set the multi-focus camera to a wide-angle photographing mode, the converter lens is put out of the optical axis and the main lens is moved backwardly along the optical axis. Thus the wide-angle mode is constituted only by the main lens.

On the other hand, in order to set the camera to a telephoto photographing mode, the main lens is moved forwardly along optical axis and the converter lens is put back on the optical axis. Thus the telephoto mode is constituted by the main lens sand converter lens.

In such conventional multi-focus camera, the alignment of the converter lens with the optical axis is relatively easy, but the lens barrel, is extremely large.

It is also necessary to provide a space within the camera body for stowing the support for the main lens in wide-angle photographing mode, therefore the camera body is also bulky.

In converter lens moving means which can avoid an increase of the size of the camera body, and movement of the converter lens is complicated, and the mechanism which aligns the axis of the converter lens with the optical axis is also complicated, therefore assembling is troublesome, which is a new problem.

This invention is intended to eliminate the above problem of the conventional apparatus.

It is a first object of this invention to provide a multi-focus camera which prevents an increase of the size of the lens barrel and prevents a decrease in the efficiency of utilizing the space of the camera body.

It is a second object of this invention to provide a multi-focus camera which is compact in structure, easy to assemble and adjust, capable of reliable aligning the axis of the converter lens with the optical axis, and holding the converter lens at a correct position relative to the main lens.

The first object of this invention is achieved by a two-focus camera in which a short focal-distance lens system is constituted by only a main lens when the main lens is set at a first position on an optical axis and a converter lens is set at a second position out of the optical axis, and a longer focal-distance lens system is constituted by the main lens and the converter lens when the main lens is set at a third position in front of the first position on the optical axis and the converter lens system is set at a fourth position behind the main lens on the optical axis, said two-focus camera comprising:

a means for moving the main lens between the first and third positions;

a lens frame for holding the converter lens;

a support member for supporting the lens frame in order that the lens frame can move freely within a predetermined limit;

a shaft fixed to one end of the support member and extending substantially orthogonal to an axis of the converter lens;

a second means for moving the shaft in parallel with the optical axis in interlock with the first means; and a third means for swiveling the shaft around an axis perpendicular to the optical axis when the shaft is moving between a predetermined intermediate position and a foremost position.

The second object of this invention is achieved by a two-focus camera in which a short focal-distance lens system is constituted by only a main lens when the main lens is set at a first position on an optical axis and a converter lens is set at a second position out of the optical axis, and a longer focal-distance lens system is constituted by the main lens and the converter lens when the main lens is set at a third position in front of the first position on the optical axis and the converter lens is set at a fourth position behind the main lens on the optical axis, said two-focus camera comprising:

a lens frame holding the converter lens and having male threads on outer periphery thereof;

an outer lens barrel threadedly engaged with the lens frame so that the lens frame can move along the optical axis;

a support member supporting the outer lens barrel in order that the outer lens barrel can move within a predetermined limit and driven in parallel with the optical axis in the vicinity of the fourth position;

a positioning plate disposed orthogonally to the optical axis for positioning the converter lens at the fourth position;

a guide member provided on the positioning plate for guiding the outer lens barrel so that an axis of the converter lens aligns with the optical axis by abutting against an outer periphery of the outer lens barrel when the converter lens is set at the fourth position; and a spring member fixed to the support member at one end thereof and fixed to the outer lens barrel at the other end thereof for urging the outer lens barrel against the positioning plate.

BRIEF DESCRIPTION OF THE DRAWINGS

FIGS. 2(A) and (B) illustrate the principles of a converter lens according to this invention, wherein FIG. 2(A) denotes an optical layout constituting a short focal-distance lens system and FIG. 2(B) shows an optical layout constituting a longer focal-distance lens system;

FIGS. 7 and 8 are partially cutaway left and right side views, respectively, of the converter lens abutting on the shutter base plate;

FIGS. 11(a), 11(b) and 11(c) are schematic side views of the modification illustrating the operation thereof.

DETAILED DESCRIPTION

Figure 1:
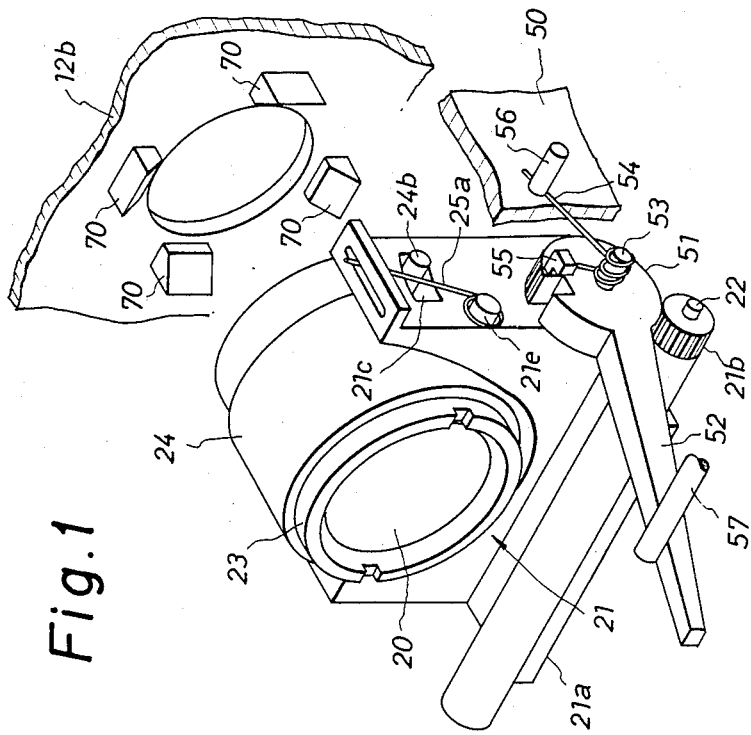
FIG. 1 is a perspective view of the essential portion of this invention.

An embodiment of this invention will now be described in detail with reference to the accompanying drawings.

Before a specific description, the basic structure of a converter lens in a two-focus camera according to this invention will be described with reference to FIGS. 2(A) and (B).

As shown in FIG. 2(A), in wide-angle photographing or short focal-distance photographing, a main lens 10 is disposed before a film surface F, an iris also functioning as a shutter 30 is disposed immediately after the main lens 10 to form a short focal-distance optical system.

At this time, the converter lens 20 supported inside a converter lens barrel 21 which in turn is supported pivotally around a shaft 22 is located outside the optical axis between the shutter 30 and the film surface F.

As shown in FIGS. 2(B), in telephoto or longer focal-distance photographing, both the main lens 10 and the shutter 30 disposed before the film surface F are moved forwardly along the optical axis and the converter lens 20 is disposed behind the main lens 10.

The converter lens 20 is moved in order that the shaft 22 moves forwardly by a predetermined distance along an axis parallel to the optical axis without being swiveled from its completely stowed position shown by a in FIG. 2(A) to an intermediate position shown by b in FIG. 2(B). If the shaft 22 is moved further forwardly, the converter lens barrel 21 is moved forwardly while swiveling counterclockwise around the shaft 22. As a result, as shown by reference characters b, c and d in FIG. 2(B), the shaft 22 is moved forwardly along the axis parallel to the optical axis while the converter lens barrel 21 is swiveled counterclockwise around the shaft 22 and the barrel 21 moves to a position shown by a reference character e.

As a result, the main lens 10 and the converter lens 20 constitute a longer focal-distance lens system.

A specific embodiment of the driving mechanism and stabilizing mechanism for the converter lens of a two-focus camera according to this invention will now be described with reference to FIGS. 1 and 3–8.

A main lens barrel 11 in which the main lens 10 comprising four lenses are disposed on the optical axis of the camera body 100. The main lens barrel 11 is fixed to a cylindrical movable barrel 12 behind which is formed a flange 12a which is fitted slidably into a guide 13 formed on the camera body 100.

Figure 4:
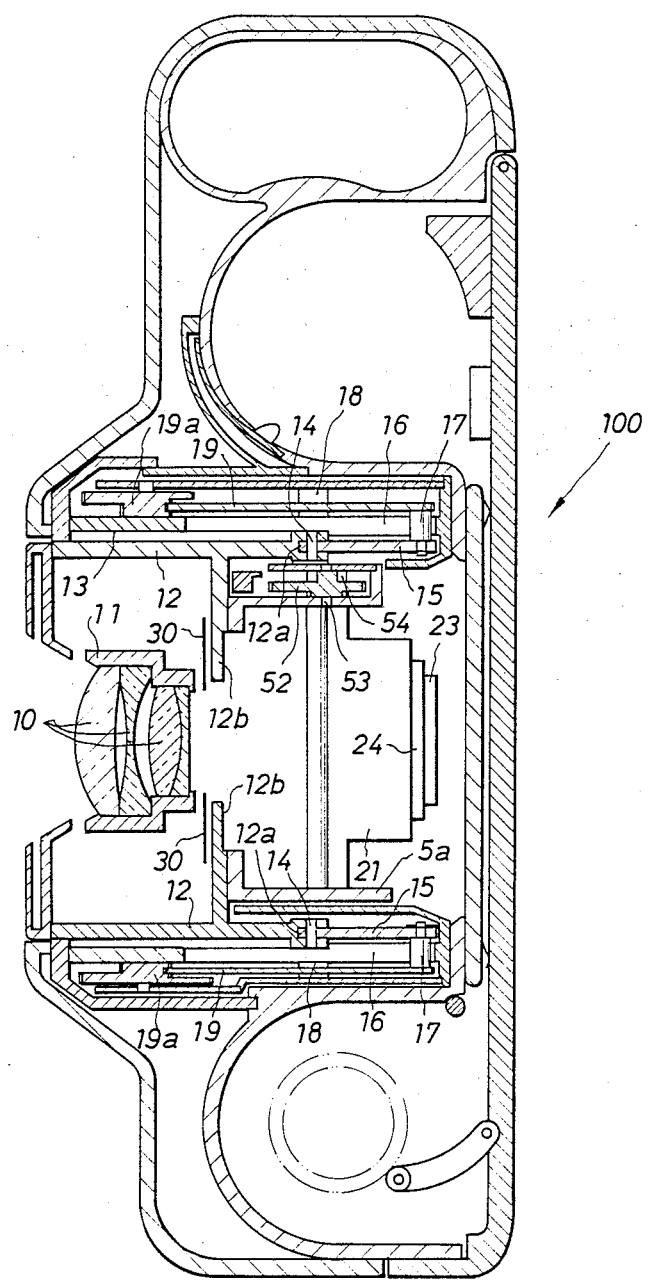
FIG. 4 is a plan cross-section view showing the same state of the camera of FIG. 3.
Figure 6:
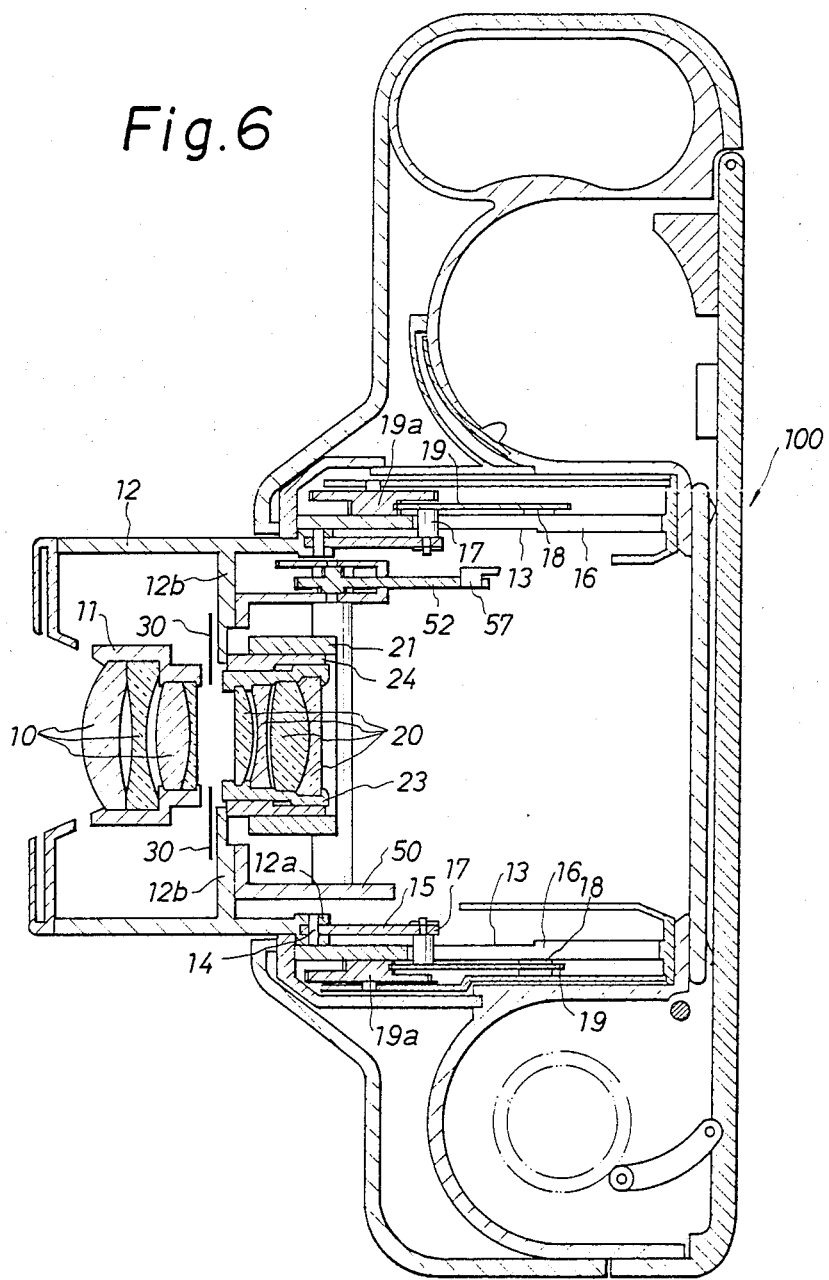
FIG. 6 is a plan cross-section view showing the same state of FIG. 5.

Formed in the middle portion of the movable barrel 12 is a shutter base plate 12b acting as a positioning plate having a circular hole through which the flux of light passes. The shutter base plate 12b has a shutter 30 also acting as an iris. As shown in FIGS. 4 and 6, the flange 12a has right and left portions, each of which is provided with a pin 14 connected to one end of an arm 15 rotatably, the other end of which has a hole into which is fitted a pin 17 which in turn is fitted into an arcuate guide slot 16 formed in the camera body 100.

The pins 17 are adapted to move within the guide slots 16 with the aid of sectoral driving plates 19 supported rotatably by support shafts 18 fixed to the camera body 100.

Therefore, when the torque of a motor (not shown) is transmitted via a reduction gear mechanism to gears 19a, the driving plates 19 having a sectoral gear meshing with the gears 19a are rotated. The pins 17 on the driving plates 19 are then moved along the guide slots 16. This causes the arms 15 and hence the pins 14 to move, so that the movable barrel 12 guided by the guides 13 can move to a reference position shown in FIGS. 3 and 4 and to a telephoto position shown in FIGS. 5 and 6.

The essential portion of this invention will next be described. The converter lens 20 constituted by four lenses is fixed to an inner barrel 23 as a lens frame as shown in detail in FIGS. 7 and 8. The inner barrel 23 having male threads 23a formed on an outer periphery thereof is threadedly engaged with female threads 24a formed at forward portion of an outer barrel 24 having a larger diameter than that of the inner barrel 23. Therefore, by rotating the inner barrel 23, the position of the inner barrel 23 with respect to the optical axis relative to the outer barrel 24 can be finely adjusted.

Shafts 24b and 24c project in opposite direction orthogonally to the optical axis from the outer periphery of the outer barrel 24.

The shafts 24b and 24c are supported elastically by a support member 21 so as to be movable in a predetermined range. The support member 21 has a receiving portion with a substantially semicircular cross section. The shafts 24b and 24c are fitted in guide holes 21c and 21d provided on either side of the support member 21 which has on either side pins 21e and 21f around which are wound torsion springs 25a and 25b at their middle portions. The torsion springs 25a and 25b urge at one end thereof the shafts 24b and 24c toward the shutter base plate 12b and are engaged at the other end thereof with spring hooks 21g and 21h on the support member 21.

The support member 21 is pivotted on a lower part of a frame 50 fixed to the back of a shutter base plate 12b. A central shaft 53 of a lever 52 having a gear 51 meshing with the gear 21b is pivotted on the frame 50.

As shown in FIG. 1, a torsion spring 54 is wound several times around the central shaft 53 of the lever 52. One end of the torsion spring 54 is fixed to a spring hook 55 provided on the lever 52 and the other end is engaged with a pin 56 provided on the side of the frame 50. The position of an end of the lever 52 is restricted by a pin 57 fixed to the camera body 100.

Figure 3:
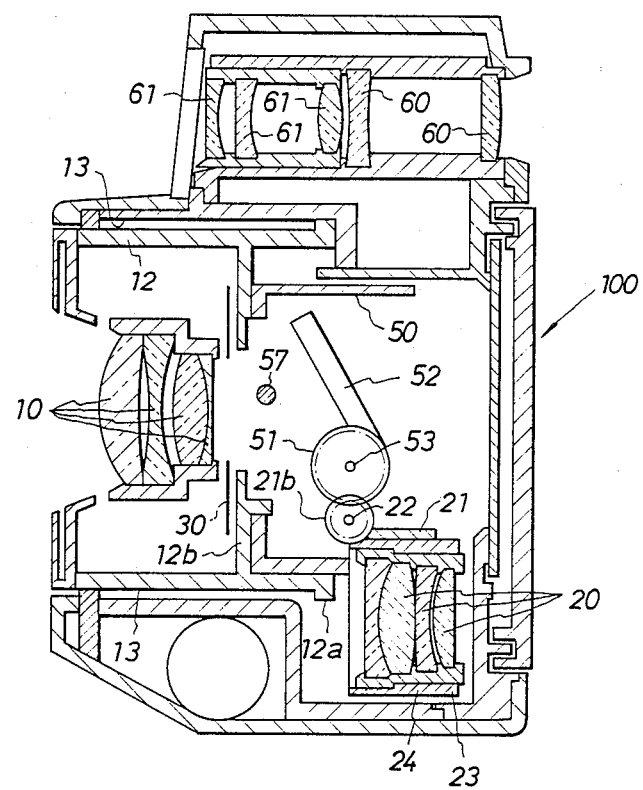
FIG. 3 is a side cross-section view showing the standard setting of a two-focus camera.
Figure 5:
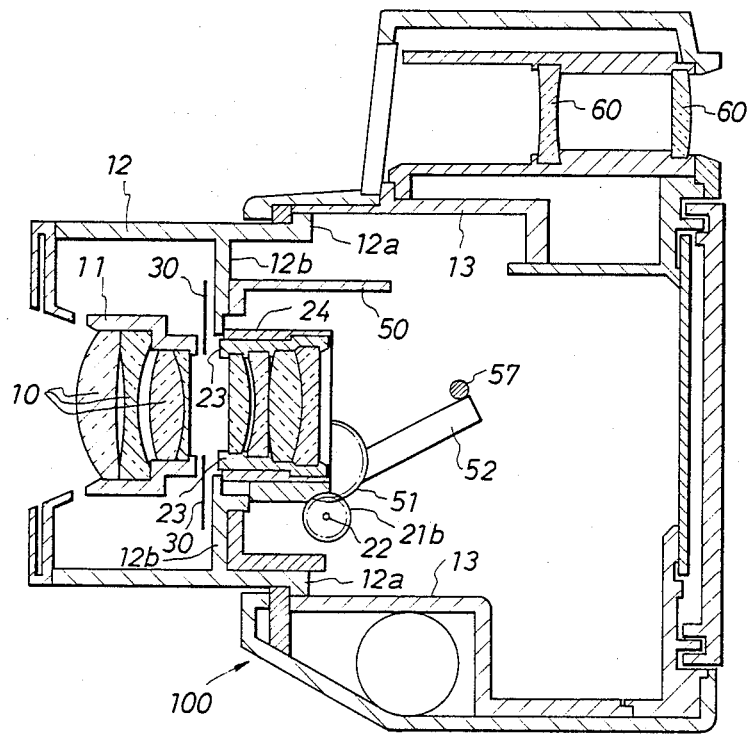
FIG. 5 is a side cross-section view of the two-focus camera set at a telephoto photographing position.

Therefore, the torsion spring 54 applies a counterclockwise turning force to the lever 52 around the central axis 53 (in FIGS. 3 and 5).

In FIG. 5, finder lenses 60 constitute a telephoto finder optical systems in telephoto photographing. In FIG. 3, auxiliary lenses 61 are inserted by a finder switching mechanism (not shown), and the auxiliary lenses 61 and finder lenses 60 constitute a standard finder optical system in standard photographing.

Lugs 70 are provided around the exposure opening in the shutter plate 12 to guide the forward portion of the outer barrel 24 into the exact position defined by the slant portions of the lugs 70 to thereby align the axis of the converter lens 20 with the optical axis.

The operation of the two-focus camera having such structure will now be described.

In standard photographing, when pin 17 is driven to its aftermost position by the gear 19a which in turn is driven by the motor via the reduction gear mechanism as shown in FIG. 4, the movable barrel 12 is retracted to its aftermost position inside the camera body 100, as shown in FIGS. 3 and 4.

At this time, the frame 50 moves together with movable barrel 12 to situate at their backward position. Therefore, the lever 52 supported on the frame 50 by the shaft 53 also moved backward to be released from the pin 57, so that the lever 52 is turned by the action of the spring 54 (FIG. 1) to thereby rotate the shaft 22 via the gears 51 and 21b. Thus the converter lens 20 is moved to its backward stowing position in the lower part of the camera body 100. Under this condition, the light shielding lug 21a (FIGS. 1 and 2) formed on the support member 21 eliminaes unnecessary light flux.

When torque of the motor (not shown) is applied to the gears 19a to shift the lenses from such standard photographing state to the telephoto photographing state, the torque is transmitted from the gears 19a to the sectoral gears to rotate the driving plates 19 around the shafts 18. As a result, the pins 17 move forwardly along the guide slots 16 and the movable barrel 12 is moved forwardly via the arms 15 and pins 14.

The frame 50 is also moved forwardly together with the movable barrel 12, therefore, the shaft 22 and the central shaft 53 move in parallel with the optical axis. The support member 21 moves forwardly in parrel with the optical axis without rotating until it reaches an intermediate position where the lever 52 hits against the pin 57.

If the frame 50 proceeds further, the central shaft 53 is moved further forwardly, so that the lever 52 abuts against the pin 57 planted on the camera body 100 whereupon the lever 52 is turned clockwise (FIG. 3) against the action of the spring 54 (FIG. 1). The torque of the lever 52 is transmitted via the gears 51 and 21b to the shaft 22 to rotate the entire support member 21 counterclockwise (FIG. 3) around the shaft 22.

Such rotation of the support member 21 continues until the forward end of the outer barrel 24 supported loosely by the support member 21 is guided by the lugs 70 for optical axis alignment and abuts against the shutter base plate 12b as shown in FIGS. 7 and 8.

Such positioning, is ensured since the shafts 24b and 24c are pushed forwardly, somewhat diagonally and downwardly by the ends of the torsion springs 25a and 25b fixed to the support member 21.

During the setting for the telephoto photographing is proceeding, the auxiliary finder lenses 61 are put out of the optical axis as shown in FIG. 5 by a finder switching mechanism (not shown) so that only the finder lenses 60 constitute the telephoto finder optical system.

To shift the lenses from the telephoto photographing state to the standard photographing state, the movable barrel 12 is moved back by an operation reverse to the operation above described and the converter lens 20 is completely put out of the optical axis.

Therefore, according to this specific embodiment, the optical axis alignment and the positioning relative to the main lens 10 for the converter lens 20 can be performed accurately and easily using a simple structure without increasing the size of the camera body and the movable barrel. Namely, since the optical axis alignment is performed by abutting the forward end of the outer barrel 24 against the shutter base plate, the total error involved in assembling the inner barrel 23, outer barrel 24 and support member 21 can be eliminated. In addition, the outer barrel 24 is fitted loosely into the support member 21, so that the high assembling accuracy is not required and hence the assembling operation is simplified, fine focusing is performed by adjusting the threaded engagement between the inner and outer barrels 23 and 24. Therefore, the adjusting operation is simplified and the manufacturing cost is reduced.

This invention is not limited to the above embodiment. Various changes and modifications could be made by those skilled in the art without departing from the spirit and gist of this invention.

For example, the lugs 70 are not limited to the discrete ones shown in FIG. 1 and may be replaced by an annular body into which the forward end of the outer barrel 24 can fit.

The springs 25a and 25b are not restricted to the substantially U-like torsion ones shown in FIG. 1 and may be coil-like springs if the installing space permits.

Figure 9:
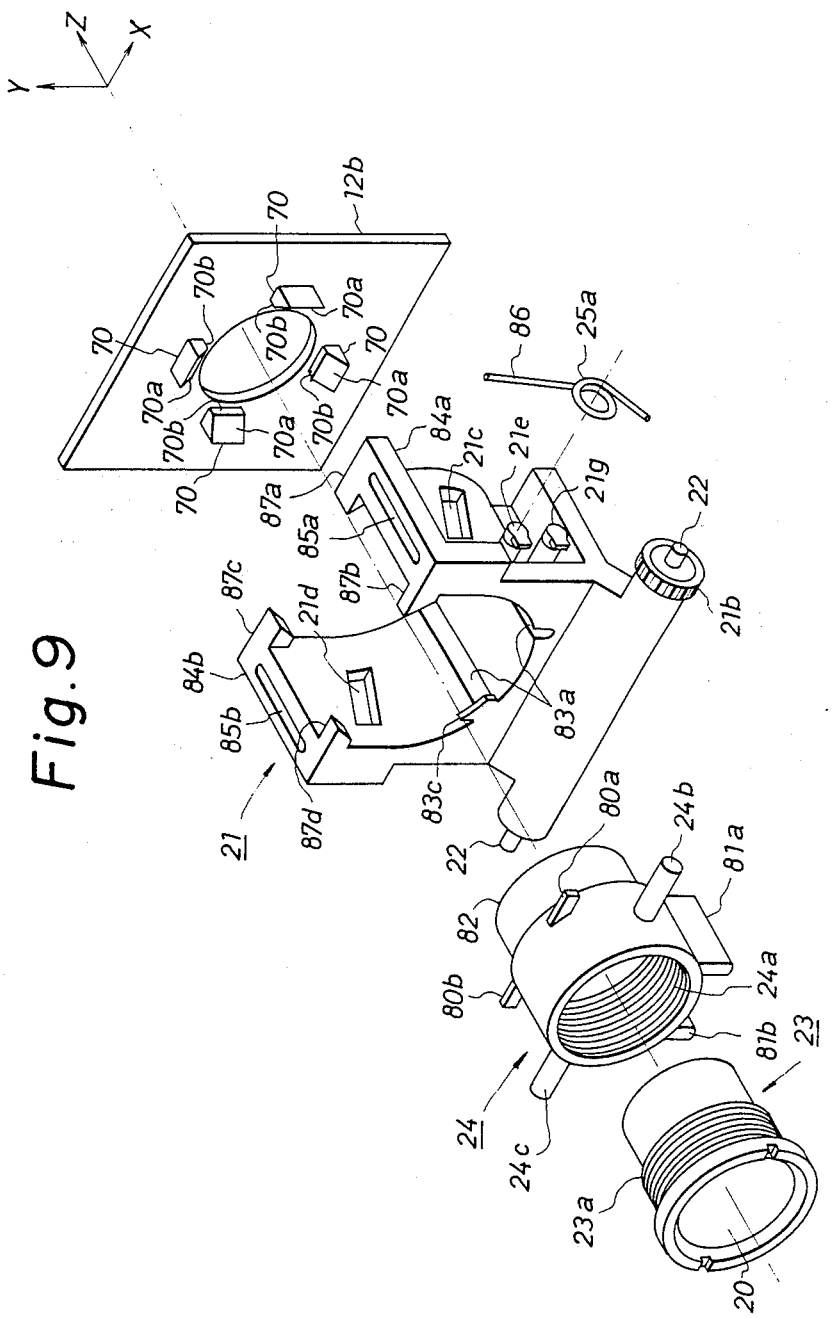
FIG. 9 an exploded perspective view of the essential portion of a modification of the embodiment.
Figure 10:
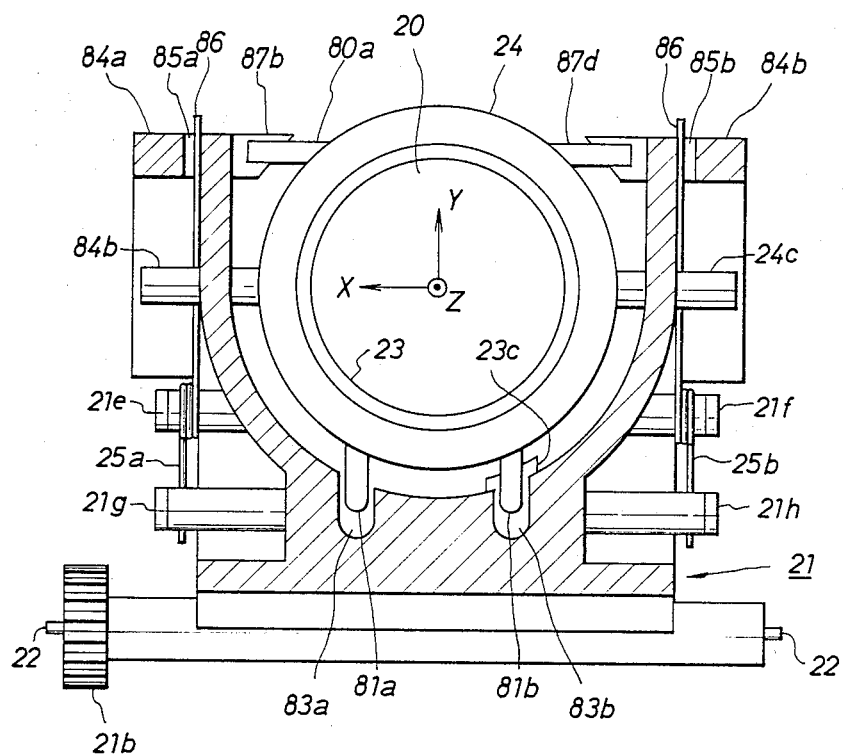
FIG. 10 is an elevational cross-section view of the modification as viewed from the shutter base plate thereof.

For example, the support member 21 and outer barrel 24 are not limited to those having the structure shown in FIG. 1 and may have structures shown in FIGS. 9–11.

In FIG. 9, assume an orthogonal coordinates in which the Z-axis extends forwardly along the optical axis, the Y-axis extends upwardly and the X-axis extends right-wardly.

Plate-like stops 80a and 80b protruding in the X-axis direction from either side of the upper portion of the outer barrel 24 are provided to restrict the movement of the outer barrel 24 in the Z-axis direction to a predetermined limit, and leg-like stops 81a and 81b extending in the optical axis direction and also protruding downwardly in FIG. 9 are provided on either side of the lower portion of the outer barrel 24 to restrict the rotational movement around each of the X-, Y- and Z-axis to a predetermined limit.

The support member 21 has at its bottom a pair of grooves 83a and 83b extending along the optical axis of the converter lens 20 and loosely receiving the stops 81a and 81b. It also has, at its bottom rear and front ends, upwardly extending stop receivers 83c and 83d (83d is not shown) which prevent the stops 81a and 81b from protruding outwardly from both the rear and front ends. The support member 21 has horizontally protruding steps 84a and 84b on either upper end of its semicircular cross section receiver. Guide slots 85a and 85b extending substantially in the optical axis direction are provided in the substantially central portions of the steps 84a and 84b so that they receive upper ends of springs 25a and 25b, respectively. Stop receivers 87a-87d are provided in opposing relationship at the front and rear ends of the steps 84a and 84d for engaging the stops 80a and 80b, respectively. Slant surfaces 70a, 70b of the lugs 70 cooperate to position the outer barrel radially. A member in FIG. 9 similar to that in FIGS. 1-8 is given the same number as in FIGS. 1-8 and further description is omitted.

FIG. 10 is an elevational cross-section view of the modification of FIG. 9 viewed from the shutter base plate 12b.

The operation of this modification having such structure will now be described with reference to FIGS. 11(a), (b) and (c). In FIG. 11(a), the shaft 24b (24c) is urged by the spring 25a (25b) against the front end of the guide slot 21c. The support member 21 is rotated clockwise around the shaft 22 toward the lugs 70 so that as shown in FIG. 11(b) the outer barrel 24 abuts at its forward end against the slant surfaces 70a of the lugs 70, the shaft 24b is retreated against the force of the spring 25a to abut against the upper end of the guide slot 21c. Under such condition, the outer barrel 24 is guided by the slant surfaces 70b to approach the shutter base plate 12b. As shown further in FIG. 11(c), the outer barrel 24 abuts at its front end 82 against the rear end of the shutter plate 12b, the shaft 24b is further retreated, thereby obtaining positioning in the optical axis direction and the positioning in the radial direction for the outer barrel 24 by the horizontal surfaces 70b to establish an optical axis alignment.

As described earlier in the above embodiment, since the shaft 24b is received loosely in the guide slot 21c, as shown in FIG. 11(b), during the outer barrel 24 is guided toward the optical axis, the outer barrel 24 and the receiver of the support member 21 may abut against each other at any position to apply an excessive force to the outer barrel 24. In order to avoid this, the rotational movement of the loosely received outer barrel 24 around the X-, Y- and Z-axes is restricted to the predetermined limit by the stops 80a and 80b, and the stops 81a and 81b to thereby restrict the movement of the outer barrel 24 to only linear movements in the X-, Y- and Z-axis directions. Namely, in the state of FIG. 11(b), the outer barrel 24 receives from the slant surfaces 70a forces to rotate the outer barrel 24 counterclockwise around the shafts 24b and 24c, or around the X-axis, but the semicircular ends of the stops 81a and 81b abut against the semicircular bottoms of the grooves 83a and 83b to convert the rotational movement of the outer barrel 24 to a substantially linear movement in the Y-axis direction.

Figure 12:
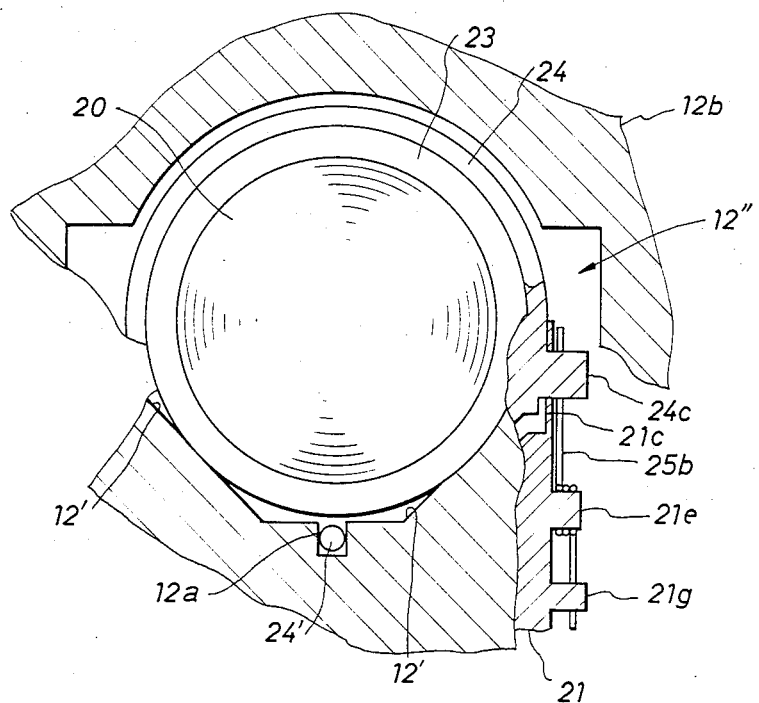
FIG. 12 is a partially cutaway elevation view of another modification.

In order to position the converter lens 20, for example, the arrangement shown in FIG. 12 may be used instead of the lugs 70 on the shutter base plate 12b as shown in FIG. 1.

Namely, the shutter base plate 12b has a V-shaped receiver 12' which receives the lower portion of the inner barrel 23 to which the converter lens 20 is fixed and has an opening 12" in which the inner barrel 23 can move freely. An outer barrel 24 threadedly engaged with the inner barrel 23 has shafts 24b and 24c (24b is not shown) which are supported by guide slots 21c and 21d provided, as in the previous embodiment, in the support member 21 which in turn has a shaft 21e, a spring receiver 21g and springs 25a and 25b (25a is not shown) as in the above embodiment. Therefore, forces urging the converter lens 20 against the shutter base plate 12b are applied to the shafts 24b and 24c via the springs 25a and 25b.

The bottom of the receiver 12' has a groove 12' a into which a rotation stopping pin 24' is fitted extending in parallel with the axis from an end face of the outer barrel 24 having a diameter larger than that of the inner barrel 23.

Therefore, the outer barrel 24 can be positioned relative to the shutter base plate 12a. At the same time, the inner barrel 23 is pressed at its bottom against the receivers 12', so that the converter lens 20 is aligned with the optical axis.

In the above embodiment the main lens 10 has been described as the standard lens, but it may be a wideangle lens. This invention may be applicable to any camera which has a mechanism for switching the lens system between a long focal-distance mode and a shorter focal-distance mode.

As seen from the above detailed description, according to this invention, the converter lens not only swivels around the fixed shaft as in the above conventional device, but also moves in parallel with the optical axis from the aftermost stowing position to the intermediate position as the main lens moves forwardly, and thereafter, swivels toward the optical axis as the main lens further moves forwardly. Therefore, the converter lens can be transferred by a small space, so that the entire space of the camera body is effectively utilized. In addition, the converter lens can be stowed outside the barrel of the main lens, so that this camera is greatly miniaturized as a camera of this type.

Although this camera is of the type in which the converter lens aligns with the optical axis after moving in parallel with the optical axis, positioning of the converter lens relative to the main lens is quite accurate and stable.

What is claimed is:

1. A two-focus camera in which a short focal-distance lens system is constituted by only a main lens when the main lens is set at a first position on an optical axis and a converter lens is set at a second position out of the optical axis, and a longer focal-distance lens system is constituted by the main lens and the converter lens when the main lens is set at a third position in front of the first position on the optical axis and the converter lens system is set at a fourth position behind the main lens on the optical axis, said two-focus camera comprising:

a first means for moving the main lens between the first and third positions;
a lens frame for holding the converter lens
a support member for supporting the lens frame in order that the lens frame can move freely within a predetermined limit;
a shaft fixed to one end of the support member and extending substantially orthogonal to an axis of the converter lens;
a second means for moving the shaft in parallel with the optical axis in interlock with the first mans; and
a third means for swiveling the shaft around an axis perpendicular to the optical axis when the shaft is moving between a predetermined intermediate position and a foremost position.

2. A two-focus camera in which a short focal-distance lens system is constituted by only a main lens when the main lens is set at a first position on an optical axis and a converter lens is set at a second position out of the optical axis, and a longer focal-distance lens system is constituted by the main lens and the converter lens when the main lens is set at a third position in front of the first position on the optical axis and the converter lens is set at a fourth position behind the main lens on the optical axis, said two-focus camera comprising:

a lens frame holding the converter lens and having male threads on outer periphery thereof;

an outer lens barrel threadedly engaged with the lens frame so that the lens frame can move along the optical axis;

a support member supporting the outer lens barrel in order that the outer lens barrel can move within a predetermined limit and driven in parallel with the optical axis in the vicinity of the fourth position;

a positioning plate disposed orthogonally to the optical axis for positioning the converter lens at the fourth position;

a guide member provided on the positioning plate for guiding the outer lens barrel so that an axis of the converter lens aligns with the optical axis by abutting against an outer periphery of the outer lens barrel when the converter lens is set at the fourth position; and a spring member fixed to the support member at one end thereof and fixed to the outer lens barrel at the other end thereof for urging the outer lens barrel against the positioning plate.

* * * * *